Dec. 24, 1957 H. T. BOOTH 2,817,396
FUEL SUPPLY SYSTEM AND VALVE THEREFOR
Original Filed Sept. 18, 1948 2 Sheets-Sheet 1
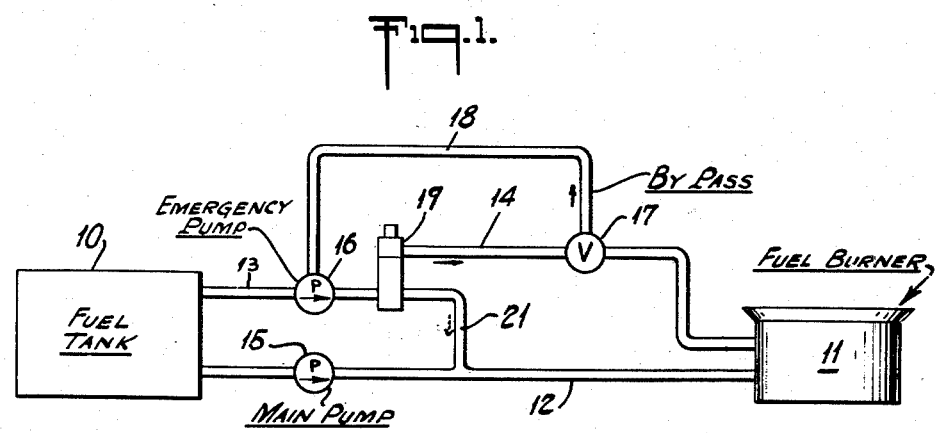
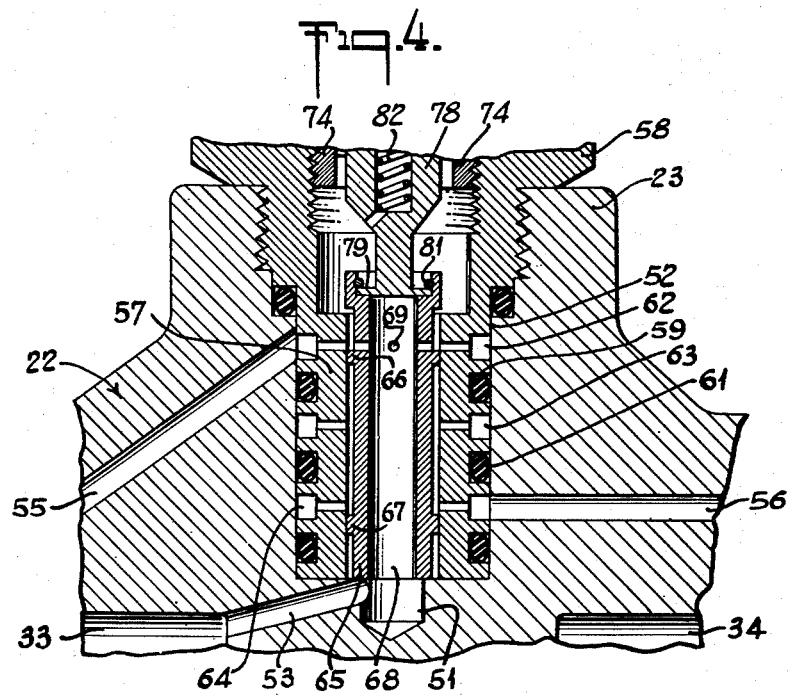
INVENTOR
HARRY T. BOOTH.
BY
HIS ATTORNEY

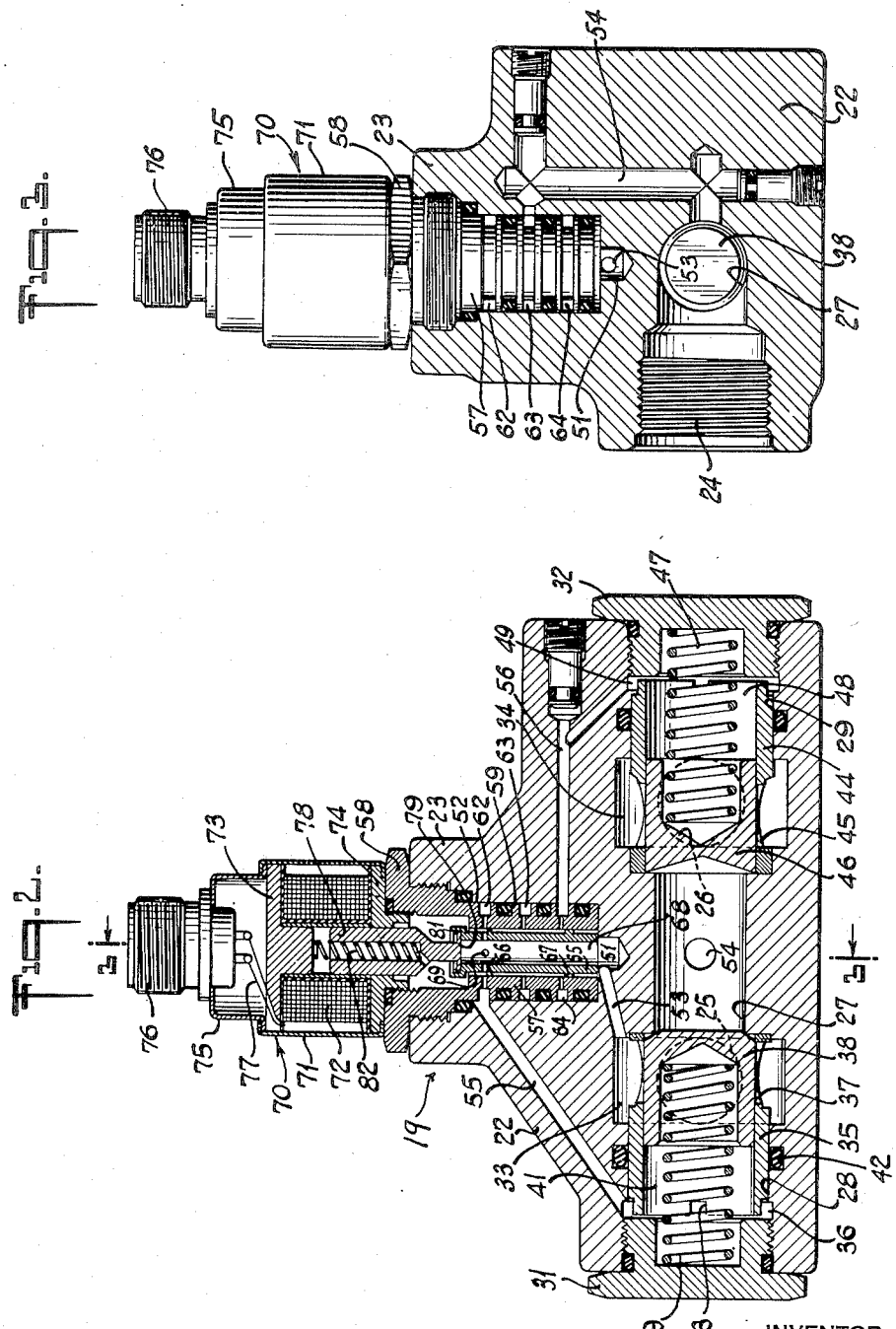

United States Patent Office 2,817,396
Patented Dec. 24, 1957

2,817,396

FUEL SUPPLY SYSTEM AND VALVE THEREFOR

Harry T. Booth, Dayton, Ohio, assignor to United Aircraft Products, Inc., Dayton, Ohio, a corporation of Ohio Original application September 18, 1948, Serial No. 49,969, now Patent No. 2,675,828, dated April 20, 1954. Divided and this application February 13, 1953, Serial No. 345,354

1 Claim. (Cl. 158—36.3)

This invention relates to fluid flowing systems, particularly as they embody a valve device operable selectively to combine the flows in parallel circuits. This is a division of application Ser. No. 49,969, filed September 18, 1948, issuing April 20, 1954, as Patent No. 2,675,828.

The invention has especial, although not limited, application to the fuel supply systems of jet powered aircraft. Such systems ordinarily comprise a main supply line leading from a storage tank to the burner, and a parallel supply line for emergency use when the main line shall have become disabled. Separate pumps in the lines are in continuous use in the operation of the system but the emergency pump normally functions merely repeatedly to circulate a small part of the fuel supply through a suitably controlled by-pass. It has been suggested that the existence of the emergency line in the system might be utilized to augment the volume of fuel supplied to the burner at times when that is desirable, for example, as when starting the engine. The present invention contemplates a reduction to practice of that idea, whereby a valve device is embodied in the system selectively operable to direct the output of the emergency pump to the main supply line.

To modify the conventional fuel supply system in this respect is an object of the invention.

Another object is to present, for a use such as that described, a fluid flow control valve characterized by a pilot valve initiated pressure differential action by which the fluid flow is directed through alternative parallel circuits.

A further object of the invention is to utilize the low pressure connection defined by the normally open by-pass in the emergency line in attaining the pressure differential for operation of the valve device.

Still another object is to provide for simplified, remote operation of the valve device by placing the pilot valve under the control of an electromagnet unitarily assembled with the valve device.

Other objects and structural details of the invention will appear from the following description when read in connection with the accompanying drawings, wherein:

Fig. 1 is a diagram of a fuel supply system in accordance with the invention;

Fig. 2 is a view in vertical longitudinal section of the valve device diagrammatically indicated in Fig. 1;

Fig. 3 is a view in cross section taken substantially along the line 3—3 of Fig. 2; and Fig. 4 is a fragmentary view, showing the pilot valve mechanism in enlarged scale.

Referring to Fig. 1, a fuel system embodying a valve device in accordance with the present invention may comprise a storage tank 10 and a burner 11. Fuel from the tank 10 is supplied to the burner 11 by way of a first or main pipe line 12 or by way of a second or alternative pipe line comprised of sections 13 and 14. A pump 15 is disposed in line 12 for withdrawing the fuel from the tank 10 and delivering it under pressure to the burner 11. A similar pump 16 is disposed in alternative pipe line section 13. The pipe line 12 and the line 13—14 are arranged in parallel relation and represent respectively primary and emergency systems. The pumps 15 and 16 operate continuously. The output of the latter normally is by-passed, however, there being provided in section 14 of the emergency system a valve 17 normally adjusted to direct flow back to the inlet side of the pump 16 by way of a by-pass conduit 18. Should the primary supply system fail to function, valve 17 is adjusted to close by-pass conduit 18 to permit fuel to be supplied to the burner by way of the emergency pipe line 13—14.

According to the present invention there is interposed between the emergency pipe line sections 13 and 14 a valve device 19 operable to direct the output of pump 16 alternatively to emergency pipe line section 14 or to the main pipe line 12 by way of a conduit 21. As before set out, the function of the valve device 19 is to permit the outputs of the pumps 15 and 16 to be combined when that is desirable in the operation of the system.

Considering the valve device 19 in greater particularity, and referring to Figs. 2 and 3, it is seen to comprise a body 22 which is roughly cylindrical viewed in end elevation except for an upstanding boss portion 23. The body 22 presents an inlet opening 24 receiving the outer end of emergency pipe line section 13 and a pair of outlet openings 25 and 26 respectively receiving the adjacent ends of emergency pipe line section 14 and by-pass conduit 21. Formed longitudinally within the body 22 is a bore 27, the inlet 24 being disposed at right angles to the bore 27 and opening therein. At the opposite ends of bore 27 are counterbores 28 and 29 respectively closed by caps 31 and 32 screw threaded therein. At or adjacent to the bottom of counterbore 28 is an annular groove 33 communicating with outlet opening 25. Within counterbore 29 is a similar groove 34 communicating with outlet opening 26. Received in counterbore 28 is a sleeve or bushing 35 seating at its inner end upon the bottom of the counterbore and received in a slight recess concentric with bore 27. The opposite or outer end of the sleeve 35 has a projecting portion of reduced diameter substantially in contact with cap 31 and defining an annular space 36 therearound. A set of radial ports 37 in sleeve 35 registers with groove 33 so that fluid may pass from bore 27 to groove 33 and outlet 25. Slidable within the sleeve 35 to control fluid flow between the bore 27 and outlet 25 is a check valve 38. The valve 38 is constructed and arranged to seat upon the bottom of counterbore 28, being formed on its inner peripheral edge with a chamber engageable with the edge defining bore 27. Valve 38 is urged to a seated or closed position within bore 27 by a spring 39 received in complementary recesses in the cap 31 and the valve 38.

Valve 38 has a relatively long bearing in the sleeve 35 and functions as a piston to define in conjunction with cap 31 a fluid pressure chamber 41 rearwardly of the valve. Communication between the chamber 41 and the groove 33 is precluded along the inner surface of the sleeve 35 by reason of the sliding fit of valve 38 within the sleeve and is precluded along the outer surface of the sleeve by a ring seal 42 recessed within a radial groove in counterbore 28. The chamber 41 is connected to the aforementioned annular space 36 by one or more notches 43 cut in the outer end of the sleeve 35.

An assembly of parts similar to that above described is mounted in counterbore 29. Thus there is arranged in this counterbore a sleeve or bushing 44 having radial ports 45 registering with groove 34. Slidable within the sleeve 44 is a piston-like check valve 46 urged to a seated position closing the adjacent end of bore 27 by a spring 47. Further the valve 46 defines in conjunction with the cap 32 a pressure chamber 48 communicating with an annular space 49 surrounding the outer end of the sleeve 44. The formation of valve 46 differs from that of valve 38 in that the former engages the bottom of counterbore 29 in surrounding, radially spaced relation to the edge of bore 27 and has a substantial bearing in that portion of sleeve 44 inward of the ports 45. The construction and arrangement is such as to prevent reverse flow from the outlet 26 to the bore 27 in the closed position of valve 46, the outlet 26 being connected to an area of high pressure as represented by main supply line 12.

The tension of the springs 39 and 47 acting upon valves 38 and 46 is such as to permit these valves to open under the normal pressure developed by emergency pump 16 and transmitted to the faces of the valves through inlet opening 24 and bore 27. A selective opening and closing of the valves is accomplished by creating relatively different pressure differentials across the valves.

Within the boss 23 of the body 22 and disposed at right angles to the bore 27 is a bore 51 and a counterbore 52. The bore 51 is connected by a passage 53 to the groove 33. The counterbore 52 is connected by a first passage 54 to the bore 27, by a second passage 55 to the annular space 36 communicating with pressure chamber 41 in back of valve 38 and by a third passage 56 to the annular space 49 communicating with pressure chamber 48 in back of valve 46. The passages 54, 55, and 56 are vertically spaced from one another along the length of counterbore 52 and in some instances are formed by a plurality of drilling operations as indicated in the drawings. Within the counterbore 52 is a bushing 57 having its inner end resting upon the bottom of counterbore 52 and being formed with an outer end of relatively greater diameter screw threaded into an enlargement of counterbore 52. The outer extremity of the bushing 57 is formed as a flange 58 overlying the boss 23. The external surface of that portion of bushing 57 lying within counterbore 52 is spool-like, being provided with a plurality of spaced circumferential grooves 59 receiving ring seals 61 (see also Fig. 4). The ring seals 61 in grooves 59 prevent the passage of fluid along the bushing 57 externally thereof and lie in alternating spaced relation to other bushing grooves 62, 63, and 64. Groove 62 registers with and is in communication with passage 55 while grooves 63 and 64 respectively register with and communicate with passages 54 and 56. Each groove 62, 63 and 64 further communicates with the interior of bushing 52 through associated radial ports therein.

In nested relation to the bushing 57 is a pilot valve 65 formed with longitudinally spaced external flanges 66 and 67. The flanges 66 and 67 are in sliding and sealing contact with the internal surface of bushing 57, the remainder of the body of the valve being radially spaced from the bushing 57. The pilot valve 65 normally limits against the bottom of counterbore 52 and is formed with a central longitudinal bore 68 registering and communicating with bore 51. There is further formed in the valve 65, adjacent the outer end thereof, a set of radial ports 69 normally registering with bushing groove 62 and its associated set of radial ports. The construction and arrangement of the parts of the pilot valve assembly thus is such as to enable the passages 55 and 56, connected to the pressure chambers 41 and 48, to be alternatively connected to the passages 53 and 54. Passage 53 by reason of its connection to groove 33 which communicates with outlet opening 25 represents a connection to a low pressure area or drain. It will be recalled that outlet 25 communicates with pipe line section 14 leading to the normally open by-pass conduit 18. Passage 54 by reason of its connection to bore 27 represents a connection to a high pressure area, bore 27 being in communication with inlet opening 24.

Valve 65 is operated by an electromagnetic device 70 lockwired or otherwise securely mounted upon flange 58 of bushing 57. This device includes a casing 71 surrounding a coil 72 which is wound upon a spool defined by spaced end plates 73 and 74. A cap 75 is mounted upon end plate 73 and supports a connector 76 through which electrical leads 77 are passed and connected to coil 72. Reciprocable within coil 72 is a plunger 78 having a stem-like outer end formed with an integral plate 79 received in the counterbored outer end of pilot valve 65 and connected thereto by a retaining ring 81. Plate 79 is loosely received in the valve 65 to allow for error in the aligning of bushing 57 and the electromagnetic device. The plunger 78 is urged by a spring 82 based upon plate 73 downward or in a direction to seat valve 65 upon the bottom of counterbore 52.

In Figs. 2 and 3 the valve device is shown with the parts in the position they assume when the pumps 15 and 16 are idle and the electromagnetic device 70 is de-energized. When the pumps 15 and 16 are started they begin respectively to direct fuel from the tank 10 to the fuel burner 11 by way of pipe line 12 and to the valve device 19 by way of emergency pipe line section 13. The output of emergency pump 16 enters the valve device 19 by way of inlet 24 and is introduced thereby into the bore 27 where it acts upon the opposed check valves 38 and 46. As a part of the same operation by which the pumps 15 and 16 are started, or by separate concomitant operation, the electromagnetic device may be energized. In response to such energization, the coil 72 sets up a magnetic attraction inducing plunger 78 to move upwardly or rearwardly within the coil against the urging of spring 82. The pilot valve 65 is constrained to follow such motion with the result that the external flanges 66 and 67 thereon are moved from a point immediately below the respective grooves 62 and 64 in the bushing 57 to a point immediately above such grooves. In this position of the parts the groove 62 is connected by the space between the flanges 66 and 67 to the bushing groove 63 communicating with passage 54, and the groove 64 communicates around the lower end of the pilot valve with bore 51 and passage 53. Accordingly, the fluid pressure developed in bore 27 by the operation of pump 16 is transmitted through passage 54, groove 62 and passage 55 to the pressure chamber 41 in back of valve 38. The pressure chamber 48 in back of valve 46 is at the same time connected through passage 56, groove 64, bore 51 and passage 53 to the annular groove 33 and outlet 25, the outlet 25 functioning at this time as a drain. Thus the inlet pressure acting upon valve 38 within bore 27 in a direction to open this valve is balanced by an opposing fluid pressure of substantially equal magnitude in chamber 41 tending to close the valve. It will be observed that the front and rear surfaces of the valve 38, as well as those of the valve 46 expose approximately equal areas to the action of the fluid pressures. The pressures on the opposite sides of valve 38 being balanced, the spring 39 is effective to maintain this valve closed. In the case of valve 36, however, there is a pressure differential on the opposite sides thereof corresponding to the difference in pressure between the bore 27 and the outlet 25. Under the influence of such pressure differential, valve 46 is caused to open and the fluid entering bore 27 is permitted to pass to outlet 26 from whence it is directed by way of conduit 21 to the main pipe line 12. The outputs of the pumps 15 and 16 thus are at this time combined and their total volume delivered to the fuel burner 11 by way of pipe line 12. When desired or when it is no longer necessary to supply an augmented quantity of fuel to the burner the electromagnetic device 70 is de-energized. When this occurs the plunger 78 is allowed to descend under the urging of spring 82 to restore the pilot valve 65 to the position shown in Fig. 2. In so moving, the external flanges 66 and 67 thereon are moved from a position immediately below those grooves. In consequence the fluid connections previously described by which check valve 46 was permitted to open are reversed. Thus passage 56 communicating with pressure chamber 48 in back of valve 46 now is connected to groove 63 and the source of high pressure by way of passage 54. Similarly, passage 55 communicating with pressure chamber 41 in back of valve 38 is connected by way of ports 69 in the valve 65 and central passage 68 therein with passage 53 and low pressure outlet 25. With the parts so positioned, therefore, the fluid pressures on the opposite sides of valve 46 are balanced and this valve is held closed by spring 47. A pressure differential exists, however, on the opposite sides of valve 38 so that this valve is allowed to open and the fluid entering bore 27 is permitted to discharge through outlet 25. From outlet 25 the fluid passes through emergency pipe line section 14 to valve 17 from whence it is recirculated by way of by-pass 18 back to the pump 16 until such time as it may become necessary to utilize the emergency system to supply the fuel burner 11.

It will be understood that in utilizing the outlet 25 as a drain to secure a pressure differential across a selected valve 38 or 46 advantage is being taken of the most immediately accessible low pressure area. It would be possible to provide a separate drain back to the tank 10 or to the inlet of pump 16, or to connect drain passage 53 to some other point of low pressure in the system. The requirement merely is that a pressure differential be established on opposite sides of a valve 38 or 46 sufficient to overcome the springs 39 or 47.

What is claimed is:

In a fuel supply system, a fuel source, a fuel burner, a main pipe line to said burner from said source, an alternative pipe line to said burner from said source, main and emergency pumps respectively in said main and alternative pipe lines, means normally operative to by-pass the output of said emergency pump, a valve device between said emergency pump and said by-pass means having a pair of outlets, one communicating with said main pipe line and the other forming a continuation of said alternative pipe line and communicating with said by-pass means, a valve at each said outlets spring loaded to close in a direction opposed to the direction of flow from said emergency pump, and means for alternatively balancing and unbalancing said valves against the effects of fluid pressure developed by said emergency pump selectively to permit the opening of one or the other of said valves.

References Cited in the file of this patent

UNITED STATES PATENTS

| | | |
|---|---|---|
| 2,506,611 | Neal et al. | May 9, 1950 |
| 2,596,815 | Keil | May 13, 1952 |
| 2,607,297 | Walker | Aug. 19, 1952 |
| 2,617,477 | Isreeli | Nov. 11, 1952 |
| 2,640,318 | Carey | June 2, 1953 |
| 2,649,905 | Mangan et al. | Aug. 25, 1953 |

FOREIGN PATENTS

| | | |
|---|---|---|
| 734,284 | Germany | Apr. 12, 1943 |